(12) United States Patent
Cho

(10) Patent No.: US 7,497,188 B2
(45) Date of Patent: Mar. 3, 2009

(54) PET BATHING APPARATUS

(75) Inventor: Weol Yeam Cho, Seoul (KR)

(73) Assignee: Petscare, Inc., Mt. Prospect, IL (US)

( * ) Notice: Subject to any disclaimer, the term of this patent is extended or adjusted under 35 U.S.C. 154(b) by 188 days.

(21) Appl. No.: 11/249,354

(22) Filed: Oct. 14, 2005

(65) Prior Publication Data

US 2006/0102096 A1  May 18, 2006

(30) Foreign Application Priority Data

Oct. 21, 2004 (DE) .................. 20-2004-0029726 U

(51) Int. Cl.
*A01K 13/00* (2006.01)
*A01K 29/00* (2006.01)

(52) U.S. Cl. .................. 119/671; 119/668; 119/673; 119/674; 119/676; 119/604; 119/606

(58) Field of Classification Search .................. 119/603, 119/604, 606, 608, 609, 665, 668, 669, 671, 119/673, 674, 676, 677, 678
See application file for complete search history.

(56) References Cited

U.S. PATENT DOCUMENTS

| | | | |
|---|---|---|---|
| 3,221,708 A * | 12/1965 | Marley .................. 119/665 |
| 3,867,906 A | 2/1975 | Johnson .................. 119/158 |
| 3,884,191 A | 5/1975 | Sout .................. 119/158 |
| 4,056,078 A | 11/1977 | Blafford et al. .................. 119/158 |
| 4,505,229 A | 3/1985 | Altissimo .................. 119/158 |
| 4,549,502 A | 10/1985 | Namdari .................. 119/158 |
| 4,730,576 A | 3/1988 | Yoshikawa .................. 119/158 |
| 4,856,126 A * | 8/1989 | Baus .................. 4/607 |
| 4,930,453 A | 6/1990 | Laliberte .................. 119/158 |
| 4,987,860 A | 1/1991 | Davis .................. 119/158 |
| 5,140,947 A * | 8/1992 | Bruce .................. 119/677 |
| 5,193,487 A | 3/1993 | Vogel .................. 119/158 |
| 5,213,064 A | 5/1993 | Mondine et al. .................. 119/158 |
| 5,243,931 A | 9/1993 | McDonough .................. 119/158 |
| 5,435,269 A * | 7/1995 | Chen .................. 119/673 |
| 5,448,966 A | 9/1995 | KmKinnon et al. .................. 119/158 |
| 5,632,231 A | 5/1997 | Moore .................. 119/671 |
| 5,678,511 A | 10/1997 | Day .................. 119/676 |
| 5,724,918 A * | 3/1998 | Navalon-Chicote .................. 119/668 |
| 6,435,136 B1 * | 8/2002 | Segura Munoz .................. 119/650 |
| 6,553,708 B1 | 4/2003 | Wolfe .................. 43/2 |
| 6,688,257 B2 | 2/2004 | Lee .................. 119/671 |
| 6,820,571 B2 * | 11/2004 | Cory .................. 119/712 |
| 2003/0033667 A1 * | 2/2003 | Lachance .................. 4/608 |
| 2005/0166862 A1 * | 8/2005 | Sanford et al. .................. 119/498 |

* cited by examiner

Primary Examiner—T. Nguyen
(74) Attorney, Agent, or Firm—Bell, Boyd & Lyod LLP

(57) ABSTRACT

A pet bathing apparatus includes an inner casing defining a space for accommodating a pet and having a transparent door for entrance and exit of the pet, an outer casing provided outside the inner casing and spaced apart from the inner casing, and a base part including a support plate having openings and a net arranged on the support plate. A spray nozzle unit distributes water into the space and includes a plurality of fixed and rotary nozzles. A water supply unit includes a main tube coupled with a plurality of branch tubes, which are coupled with the spray nozzle unit, a water feeding pipe defining a water supply path to the main tube, and a container for supplying shampoo to the water feeding pipe. A drain unit collects and removes water, and a blowing unit provides air to the inner casing.

9 Claims, 13 Drawing Sheets

PET BATHING APPARATUS

CROSS REFERENCE TO RELATED APPLICATION

This application claims priority to and the benefit of Korean Patent Application No. 20-2004-0029726, filed on Oct. 21, 2004, which is hereby incorporated by reference for all purposes as if fully set forth herein.

BACKGROUND OF THE INVENTION

1. Field of the Invention

The present invention relates generally to a washing apparatus and, more particularly, to a pet bathing apparatus.

2. Discussion of the Background

Generally, when it is desired to bathe a pet, the pet may be washed using a detergent after filling a bathtub or bucket with water. Additionally, a pet may be washed using a detergent while spraying wash water on the pet with a shower nozzle or the like. However, when using such methods, the person washing the pet needs to pay attention to the pet's movement. Further, when a pet shakes itself to remove water from its body, the water on its hair sprays in all directions, thus getting nearby people and surroundings wet and dirty. Furthermore, when drying the pet, its hair may be blown around by hot air and/or noise may be generated, thus causing inconvenience to the washer.

Korean U.M. Registration No. 315478 discloses a pet bathing apparatus to solve such problems.

According to the disclosed pet bathing apparatus, a pet may be washed and dried by automatically supplying hot water and a detergent to a sealed bathing container, thus preventing a washer and the surroundings from becoming dirty, and allowing a washing operation to be easily carried out. However, since this conventional pet bathing apparatus utilizes fixed spray nozzles to spray wash water in a certain direction, all body parts of the pet may not be uniformly washed. Further, hot air fed into the sealed bathing container may make it more difficult for the pet to breathe. In this apparatus, a safety net separates the pet from the spray nozzles and a hot air gate. However, after the apparatus has been repeatedly used, the safety net may sag due to the pet's weight, which may threaten the security of the pet and cause the apparatus to malfunction.

SUMMARY OF THE INVENTION

The present invention provides a pet bathing apparatus that may substantially uniformly spray wash water on a pet, thus enhancing cleanliness and washing efficiency.

The present invention also provides a pet bathing apparatus that may smoothly discharge wash water and hot and cold air fed into a sealed space to the outside of the apparatus, together with dirt removed from the pet's body.

The present invention also provides a pet bathing apparatus having a firm base that may resist sagging due to the pet's weight, in addition to enabling an effective draining operation.

Additional features of the invention will be set forth in the description which follows, and in part will be apparent from the description, or may be learned by practice of the invention.

The present invention discloses a pet bathing apparatus, including an inner casing defining a space to accommodate a pet therein, and having a transparent door for entrance of the pet, an outer casing provided outside the inner casing and spaced apart from the inner casing, and a base part including a support plate having openings and a net arranged on the support plate. A spray nozzle unit distributes water into the space and includes a plurality of fixed nozzles and a plurality of rotary nozzles. A water supply unit includes a main tube coupled with a plurality of branch tubes, which are coupled with the spray nozzle unit, a water feeding pipe to define a water supply path to the main tube, and a first container to supply a substance for cleaning the pet to the water feeding pipe. A drain unit collects and removes water, and a blowing unit provides air to the inner casing.

The present invention also discloses a pet bathing apparatus including an inner space for accommodating a pet therein and an outer casing provided outside the inner space. A spray nozzle unit distributes water into the inner space, and includes a plurality of fixed nozzles and a plurality of rotary nozzles. A water supply unit supplies water to the spray nozzle unit, and a drain unit collects and removes water. Nozzles of the spray nozzle unit distribute water into the inner space from at least two lateral sides of the inner space and from a top and a bottom of the inner space.

The present invention also discloses a pet bathing apparatus including an inner casing defining a space to accommodate a pet therein and having a transparent door for entrance of the pet and a collapsible partition wall that is capable of dividing the space into at least two spaces. An outer casing is provided outside the inner casing and is spaced apart from the inner casing, and the pet is positioned on a base that forms a bottom of the space. A spray nozzle unit distributes water into the space and includes a plurality of fixed nozzles and a plurality of rotary nozzles. A water supply unit includes a main tube coupled with a plurality of branch tubes, which are coupled with the spray nozzle unit, a water feeding pipe to define a water supply path to the main tube, and a container for supplying shampoo to the water feeding pipe. A drain unit collects and removes water, and a blowing unit provides air to the space. The water supply unit is arranged in a space between the inner casing and the outer casing.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

Figure 1:
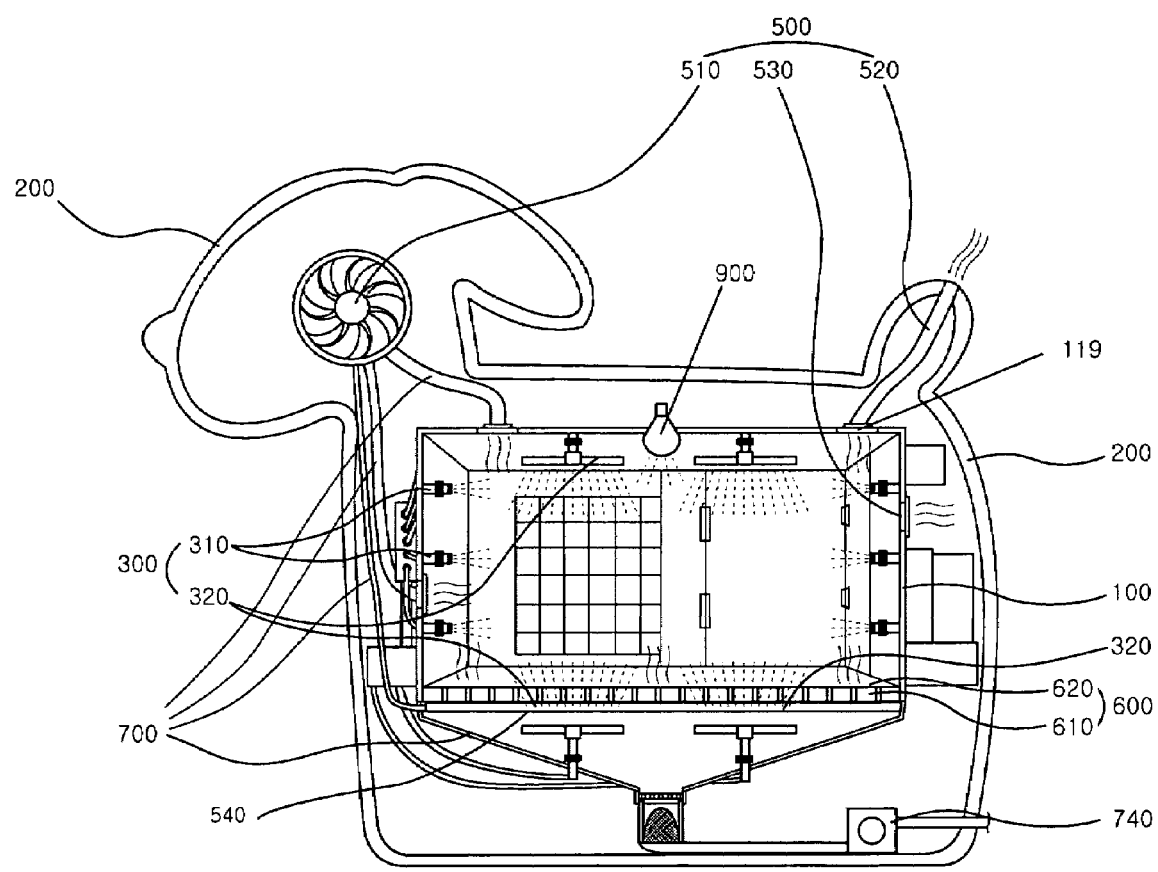
FIG. 1 is a front sectional view showing a pet bathing apparatus according to an exemplary embodiment of the present invention.
Figure 2:
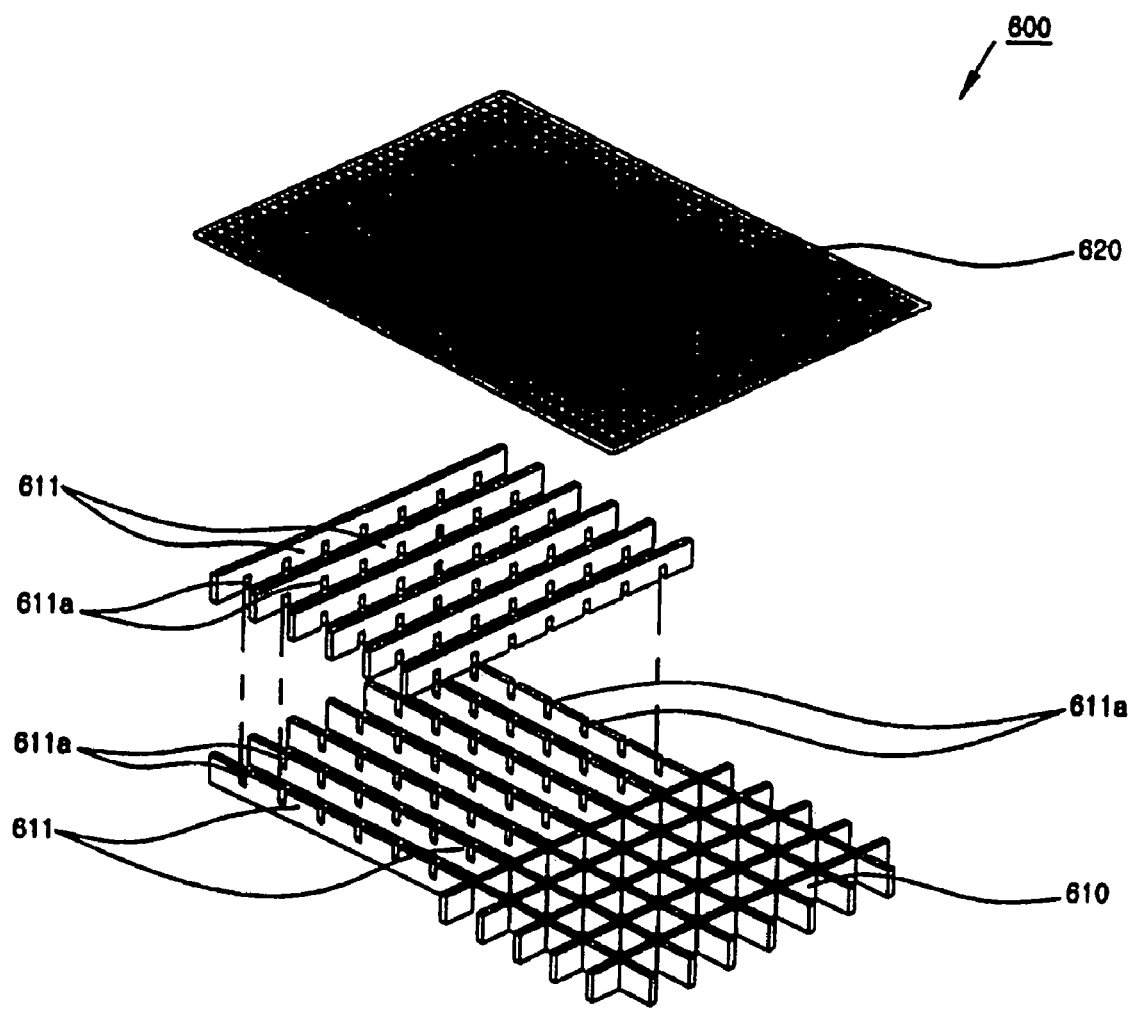
FIG. 2 is an exploded perspective view of a base part of a pet bathing apparatus according to an exemplary embodiment of the present invention.
Figure 3:
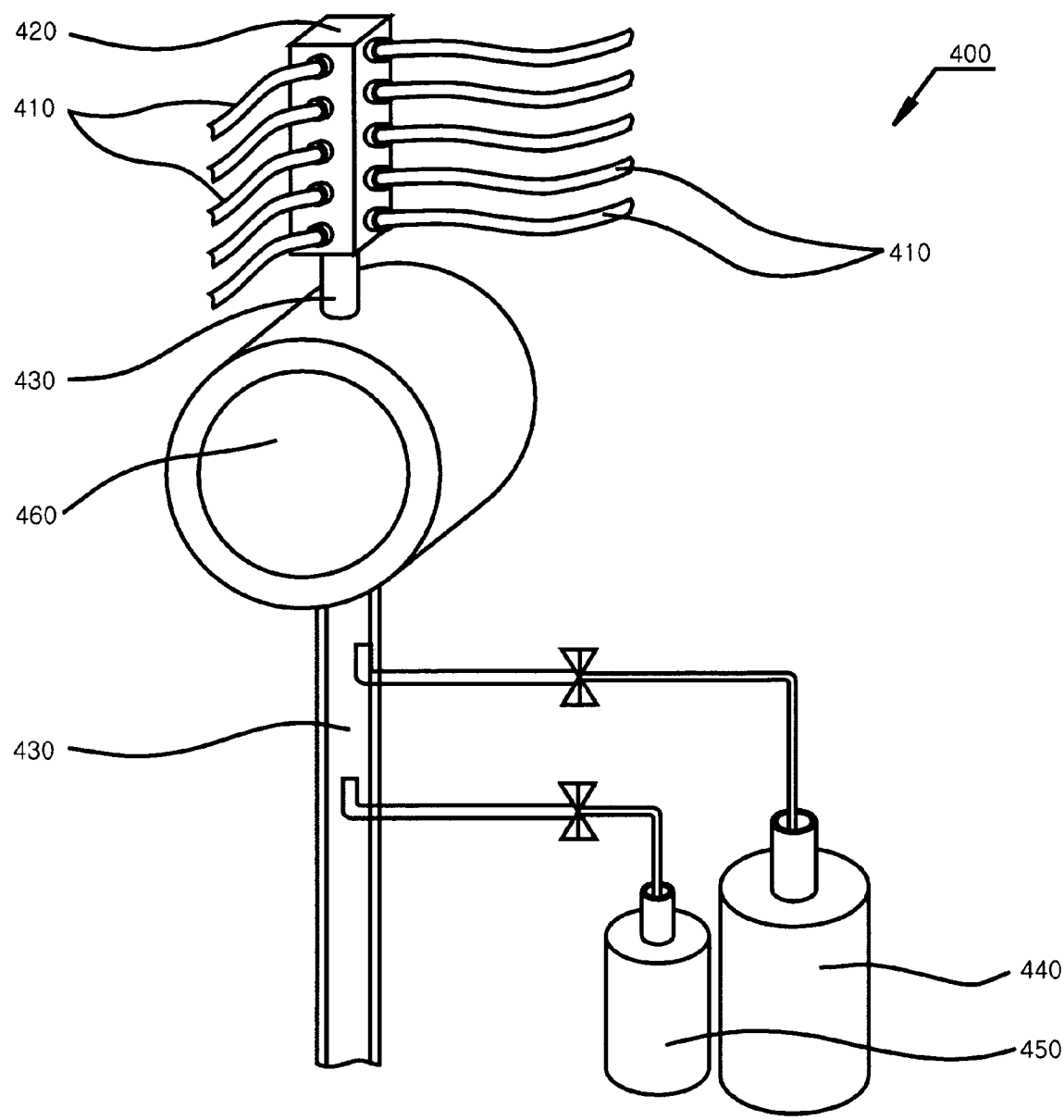
FIG. 3 is a schematic view of a water supply unit of a pet bathing apparatus according to an exemplary embodiment of the present invention.
Figure 4:
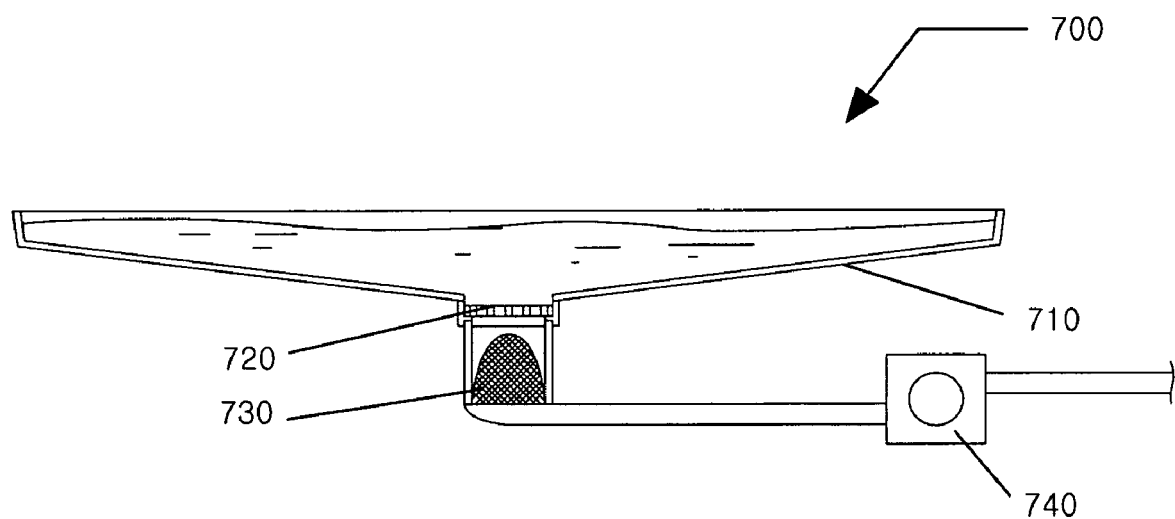
FIG. 4 is a front sectional view of a drain unit of a pet bathing apparatus according to an exemplary embodiment of the present invention.
Figure 5:
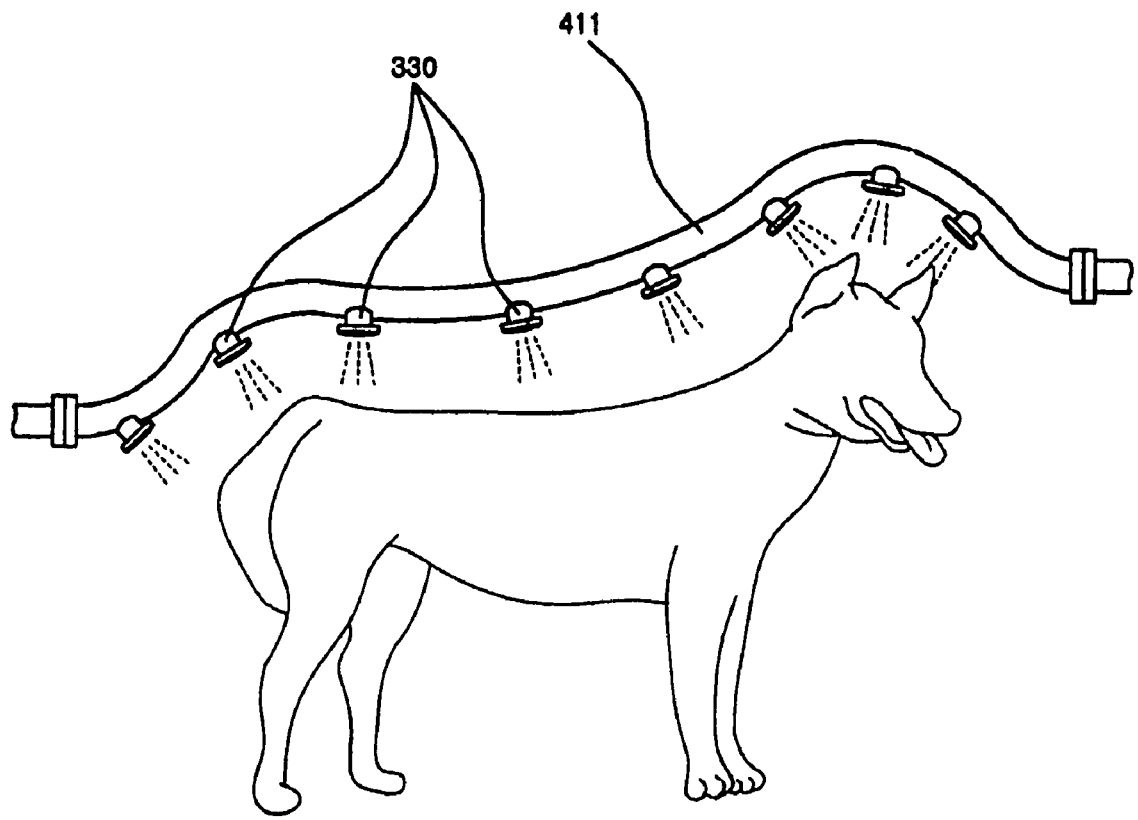
FIG. 5 is a front view showing a movable water supply tube and movable nozzles of a pet bathing apparatus according to an exemplary embodiment of the present invention.
Figure 6:
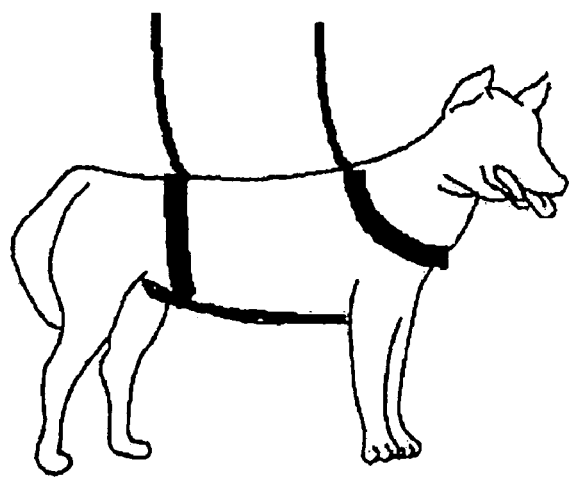
FIG. 6 is a perspective view showing a swing-like strap.
Figure 7A:
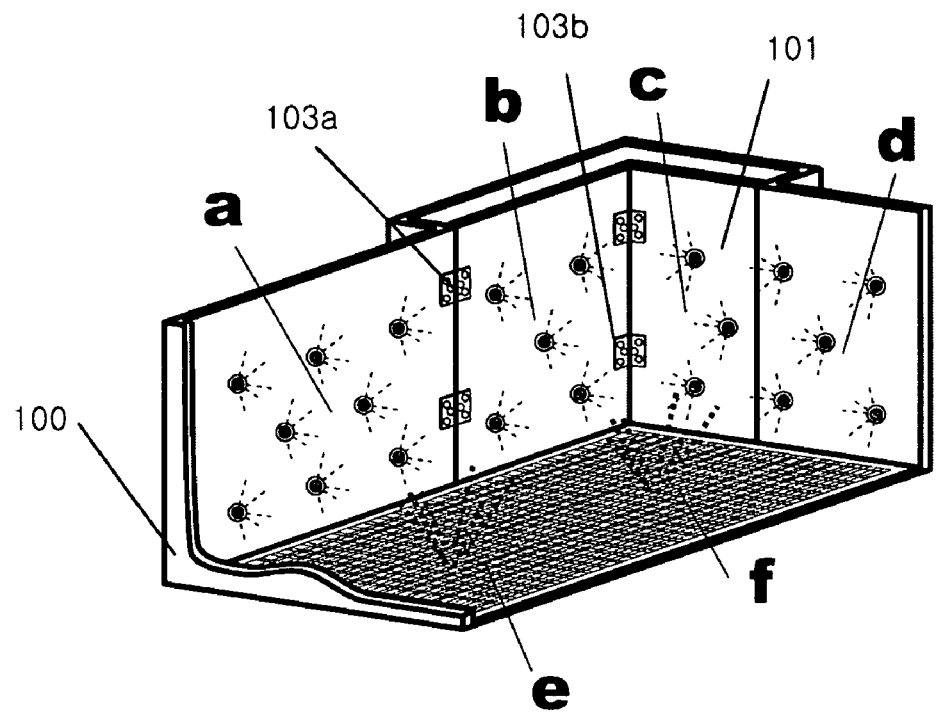
FIG. 7A and FIG. 7B are perspective views showing a collapsible partition wall of an inner casing according to an exemplary embodiment of the present invention.
Figure 7B:
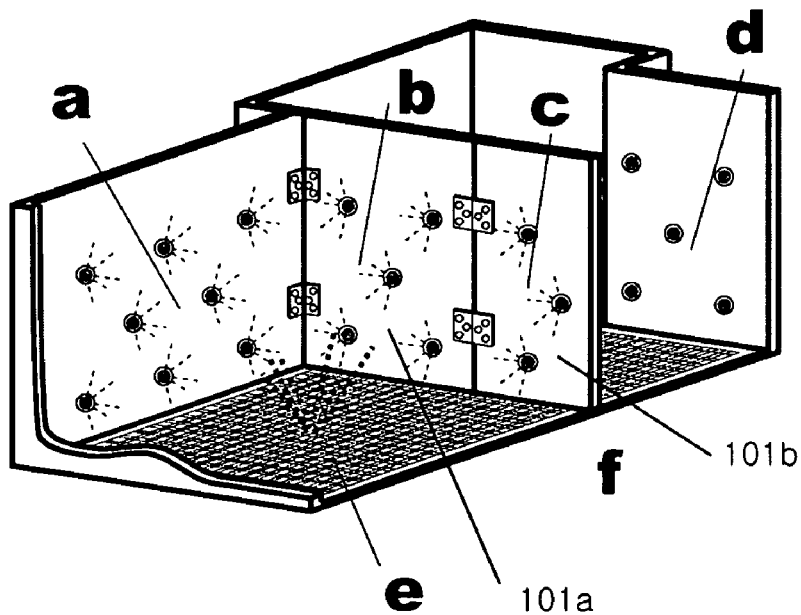
Figure 7C:
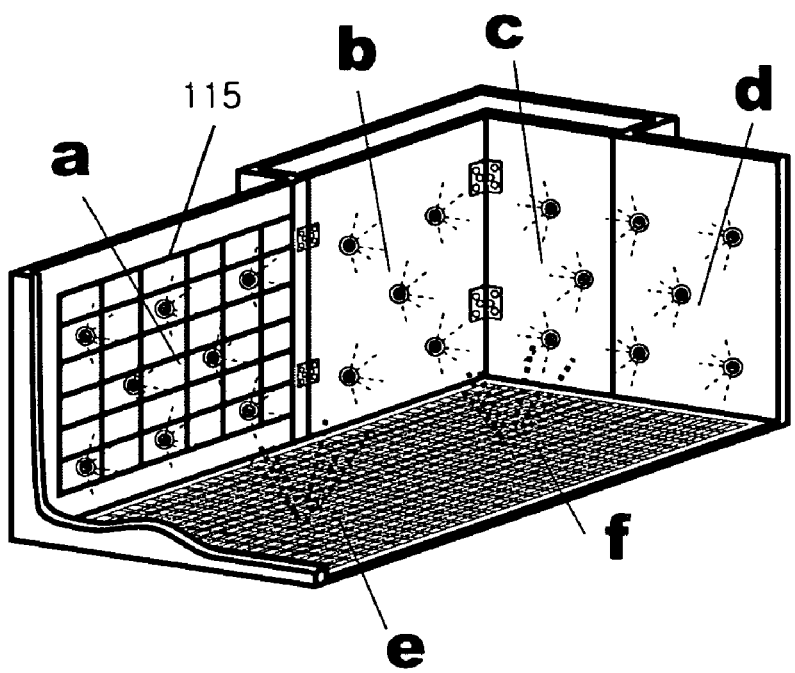
FIG. 7C and FIG. 7D are perspective views showing a separator of an inner casing according to an exemplary embodiment of the present invention.
Figure 7D:
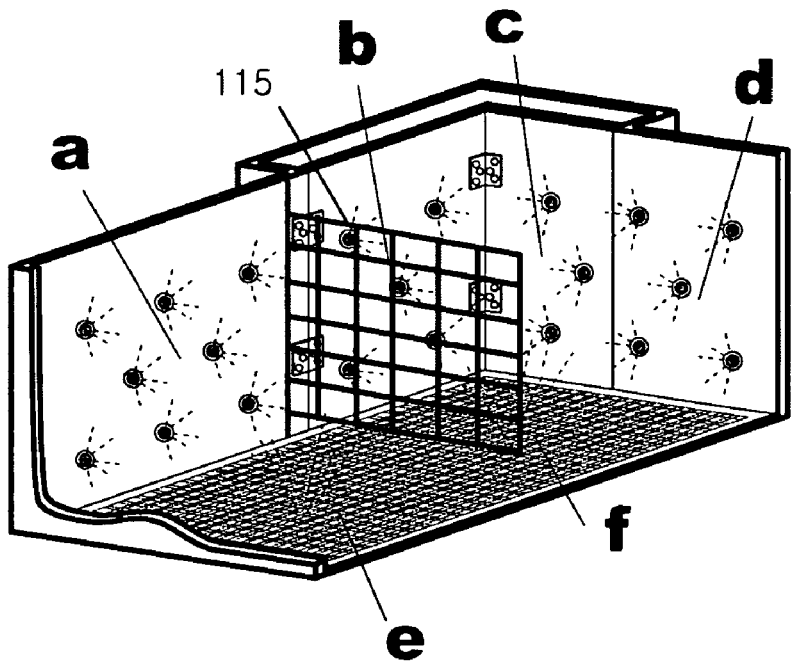
Figure 8:
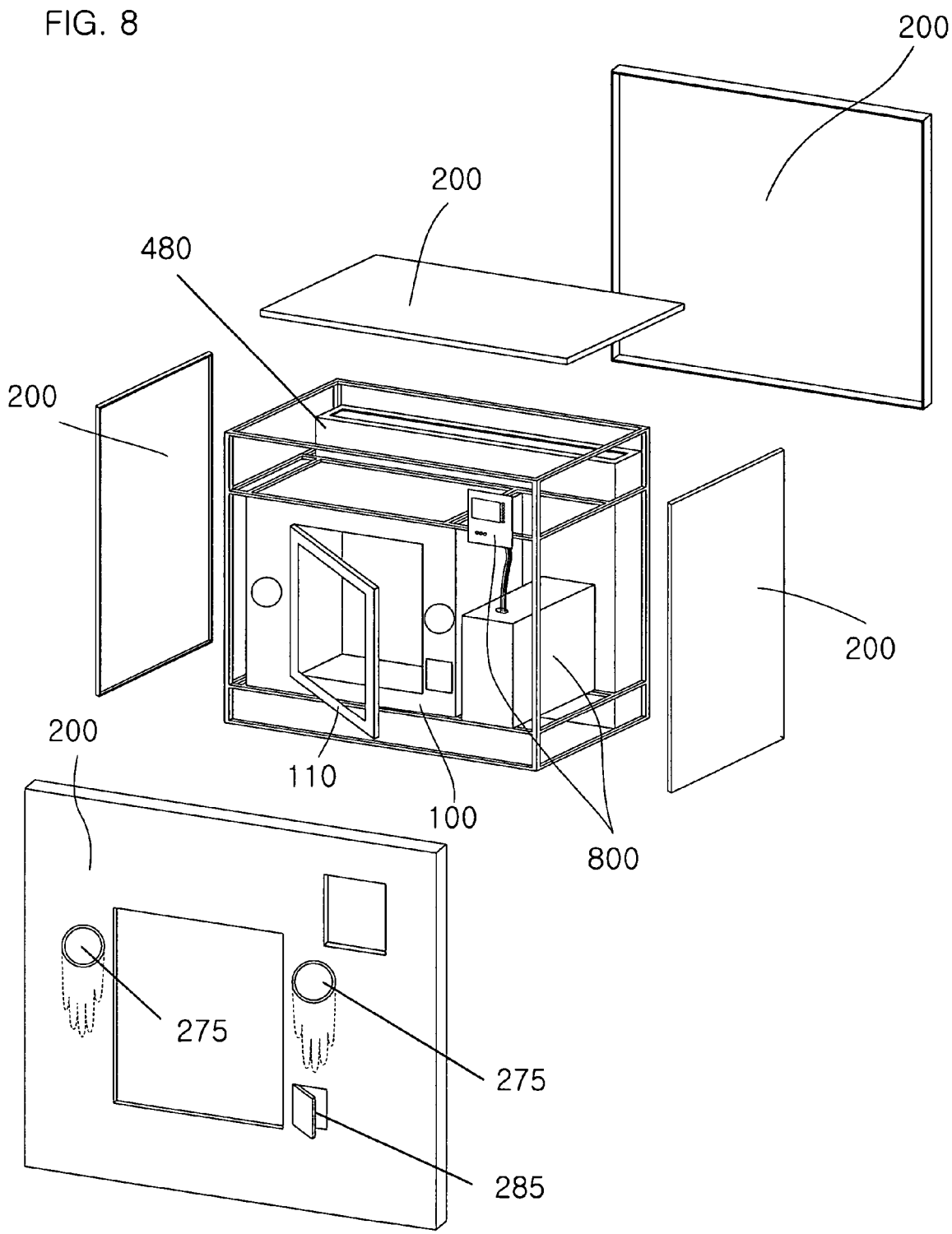
FIG. 8 is an exploded perspective view of a pet bathing apparatus according to an exemplary embodiment of the present invention.

FIG. 1 is a front sectional view showing a pet bathing apparatus according to an exemplary embodiment of the present invention, FIG. 2 is an exploded perspective view of a base part, FIG. 3 is a schematic view of a water supply unit, FIG. 4 is a front sectional view of a drain unit, FIG. 5 is a front view showing a movable water supply tube and movable nozzles, FIG. 6 is a perspective view showing a swing-like strap, and FIG. 7A and FIG. 7B are perspective views showing a collapsible partition wall. FIG. 7C and FIG. 7D are perspective views showing a separator 115 of an inner casing according to an exemplary embodiment of the present invention. FIG. 8 is an exploded perspective view of a pet bathing apparatus according to an exemplary embodiment of the present invention.

A bathing apparatus according to an exemplary embodiment of the present invention may include an inner casing 100, an outer casing 200, a base part 600, a spray nozzle unit 300, a water supply unit 400, a drain unit 700, and a blowing unit 500. The inner casing 100 defines an internal space for accommodating a pet. The outer casing 200 defines an external appearance of the apparatus, and a space is formed between the outer casing 200 and the inner casing 100 to accommodate the water supply unit 400, the drain unit 700, the blowing unit 500, etc. The base part 600 provides a surface on which the pet may stand. The spray nozzle unit 300 functions to substantially uniformly spray wash water into the inner casing 100. The water supply unit 400 functions to supply, for example, wash water, water containing shampoo, and perfume to the spray nozzle unit 300. The drain unit 700 collects water flowing from the inner casing 100 and discharges the collected water to the outside. The blowing unit 500 feeds air, which may be hot or cold, into the inner casing 100, in addition to circulating air.

According to the exemplary embodiment shown in FIG. 1, the inner casing 100 defines a predetermined space to accommodate the pet therein. The outer casing 200 may have a visually appealing shape, such as a dog shape, and it is installed outside the inner casing 100 and spaced apart from the inner casing 100. The inner and outer casings 100 and 200 may be made of, for example, stainless steel, plastic, or fiberglass reinforced plastic (FRP). A plurality of spray nozzles 310 and 320 may be mounted to an inner surface of the inner casing 100, as well as below the base part 600. Referring to FIG. 8, the apparatus may further include holes 275 in the inner and outer casings 100 and 200, with gloves attached to the holes, thereby enabling a user to hand wash the pet, as necessary. Further, a sealable opening 285 may be provided in the inner and outer casings 100 and 200 so that a food treat may be easily provided to a pet inside the apparatus.

A transparent door 110 (FIG. 8 and FIG. 9) may be provided on the front of the inner casing 100 to permit the entrance and exit of the pet. The transparent door 110 is made of a transparent material, such as glass or acryl, thus allowing an animal inside the apparatus and a person outside the apparatus to easily see each other. The transparent door 110 may have a handle on an outer portion of the apparatus so that it may be opened or closed only by a person outside the apparatus. A second door, which may also be transparent, may be provided at an opposite side of the apparatus as the transparent door 110 so that a pet may enter and leave the apparatus facing forward without having to turn around.

Further, as shown in FIG. 7A and FIG. 7B, the pet bathing apparatus may include a collapsible partition wall 101. The collapsible partition wall 101 may be rotatably coupled at an edge thereof with an inner surface of the inner casing 100 via first hinges 103a. The collapsible partition wall 101 may include two parts 101a and 101b that are rotatably coupled with each other via second hinges 103b. The two parts 101a and 101b may be folded to form an inside wall of the inner casing 100, as FIG. 7A shows, in the case of a larger pet. With a larger pet, the spray nozzles in areas a, b, c, d, e, and f may supply water. Alternatively, as FIG. 7B shows, when it is desired to partition the space defined by the inner casing 100 into two spaces, the collapsible partition wall 101 may be rotated inwards by unfolding the two parts 101a and 101b. Such a construction allows a smaller pet to be washed and dried in a space that may be more appropriate for the pet's size, therefore increasing energy efficiency. As FIG. 7B shows, in the case of a small pet, the spray nozzles in areas a, b, c, and e may supply water. Hence, in the case of a small pet, it is possible to reduce the space utilized when washing the pet, thus more efficiently supplying wash water to the pet, therefore enhancing the washing efficiency.

The pet bathing apparatus may also include a separator within the inner casing to save time when washing smaller pets. FIG. 7C and FIG. 7D are perspective views showing a separator 115 of an inner casing 100 according to an exemplary embodiment of the present invention. Referring to FIG. 7C and FIG. 7D, the separator 115 may be a door, which has openings corresponding to the nozzles in area a, that may be swung into place to separate the space defined by the inner casing 100 into two spaces, thereby allowing two pets to be simultaneously bathed.

Figure 12:
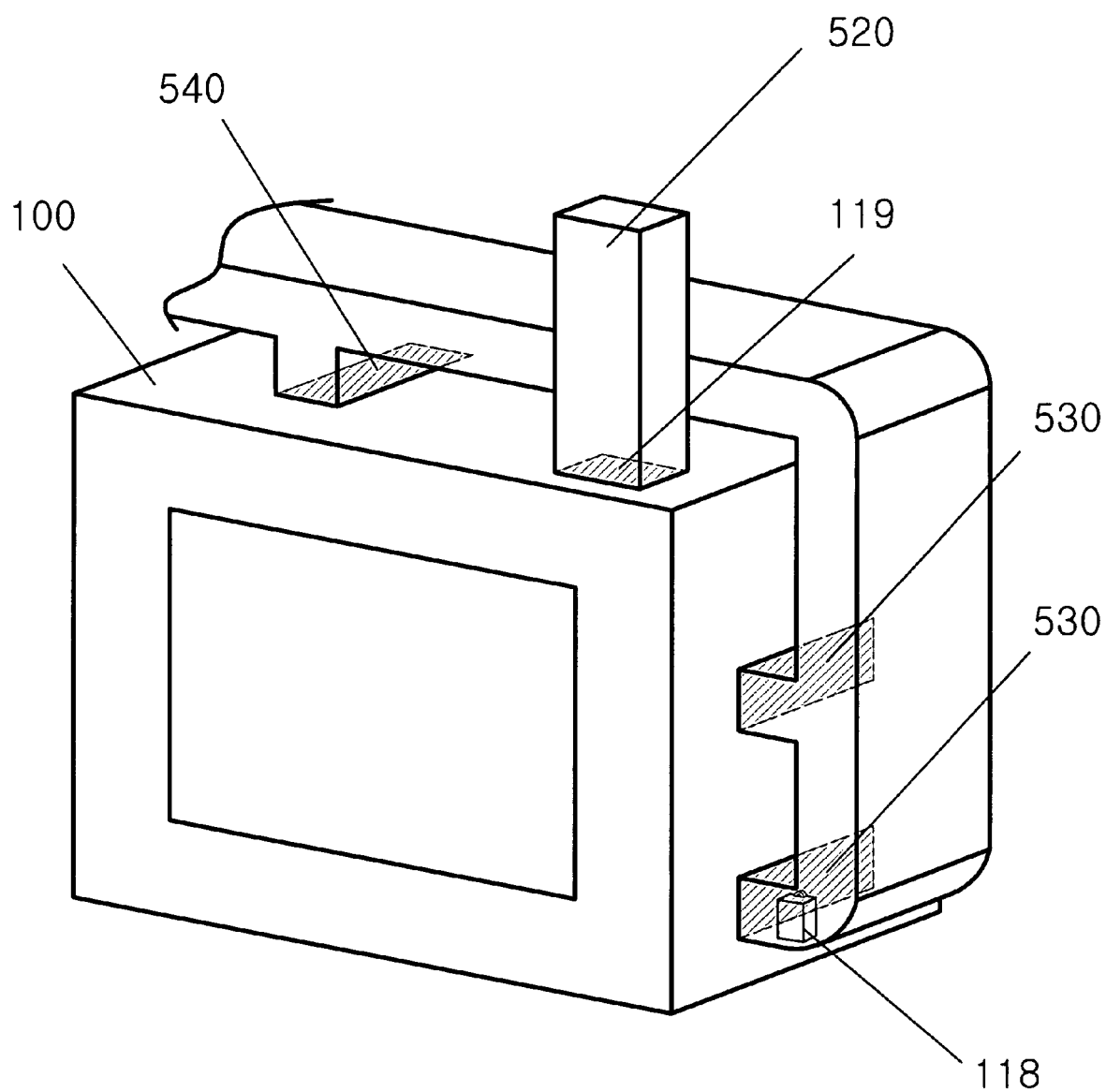
FIG. 12 shows a negative ion generator according to an exemplary embodiment of the present invention.

A negative ion generator may be included with the pet bathing apparatus. For example, referring to FIG. 12, the negative ion generator 118 may be provided with an air duct 119 that is coupled with the inner casing 100. The negative ion generator 118 and air duct 119 provide negative ions to the space defined by the inner casing 100, which may revitalize the pet's skin and fur, as well as remove bad odor.

Further, a swing-like net or a swing-like strap, such as that shown in FIG. 6, may be provided in the inner casing 100 to suspend the pet in the air, thus preventing the pet from injuring itself if the pet resists the washing and drying processes. The net or strap may also help wash water and blown air to be directly applied under the legs and to the groin of the pet.

Figure 13:
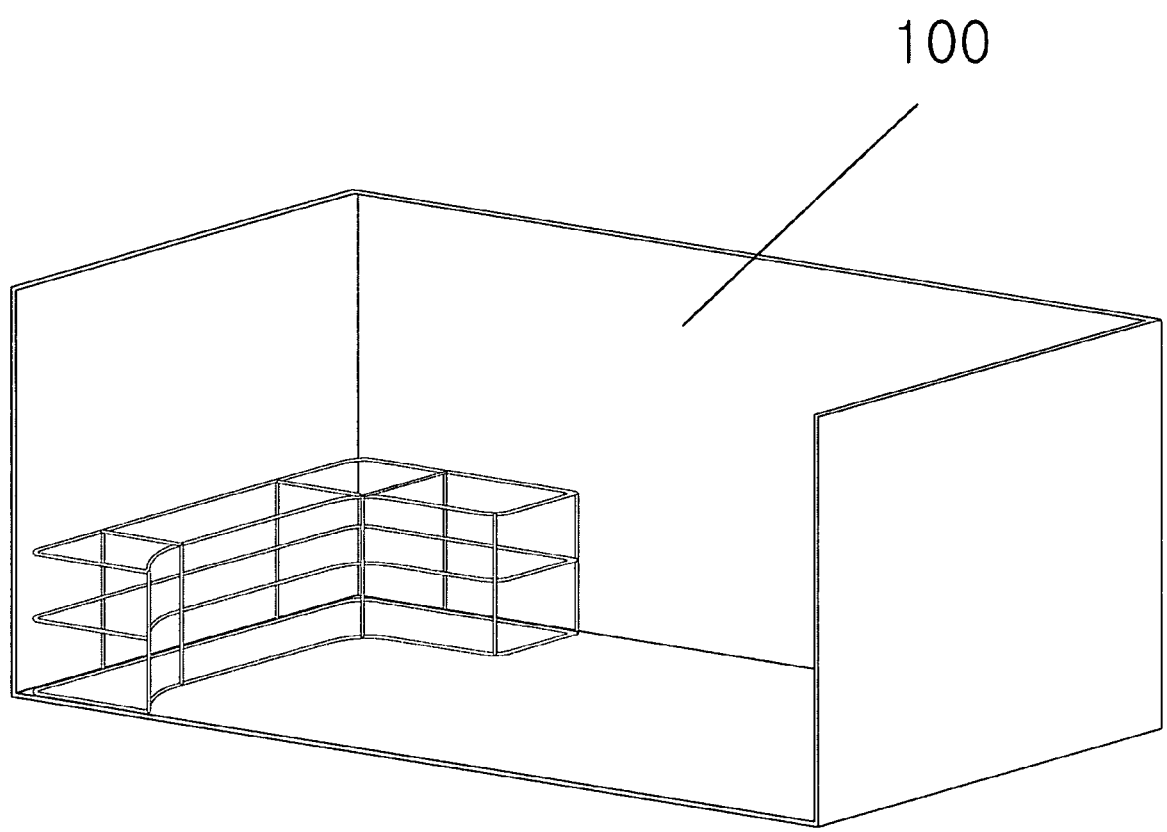
FIG. 13 shows an anti-cornering device according to an exemplary embodiment of the present invention.

An anti-cornering device may be provided in the pet bathing apparatus. Such a device helps to prevent a smaller pet from hiding in a corner to try to avoid the sprayed water. For example, referring to FIG. 13, the anti-cornering device may include a plurality of thin beams coupled with each other and protruding out from corners of the inner casing 100. The coupled thin beams not only prevent a pet from entering a corner, they also do not substantially interfere with the water sprayed from the spray nozzles.

Figure 9:
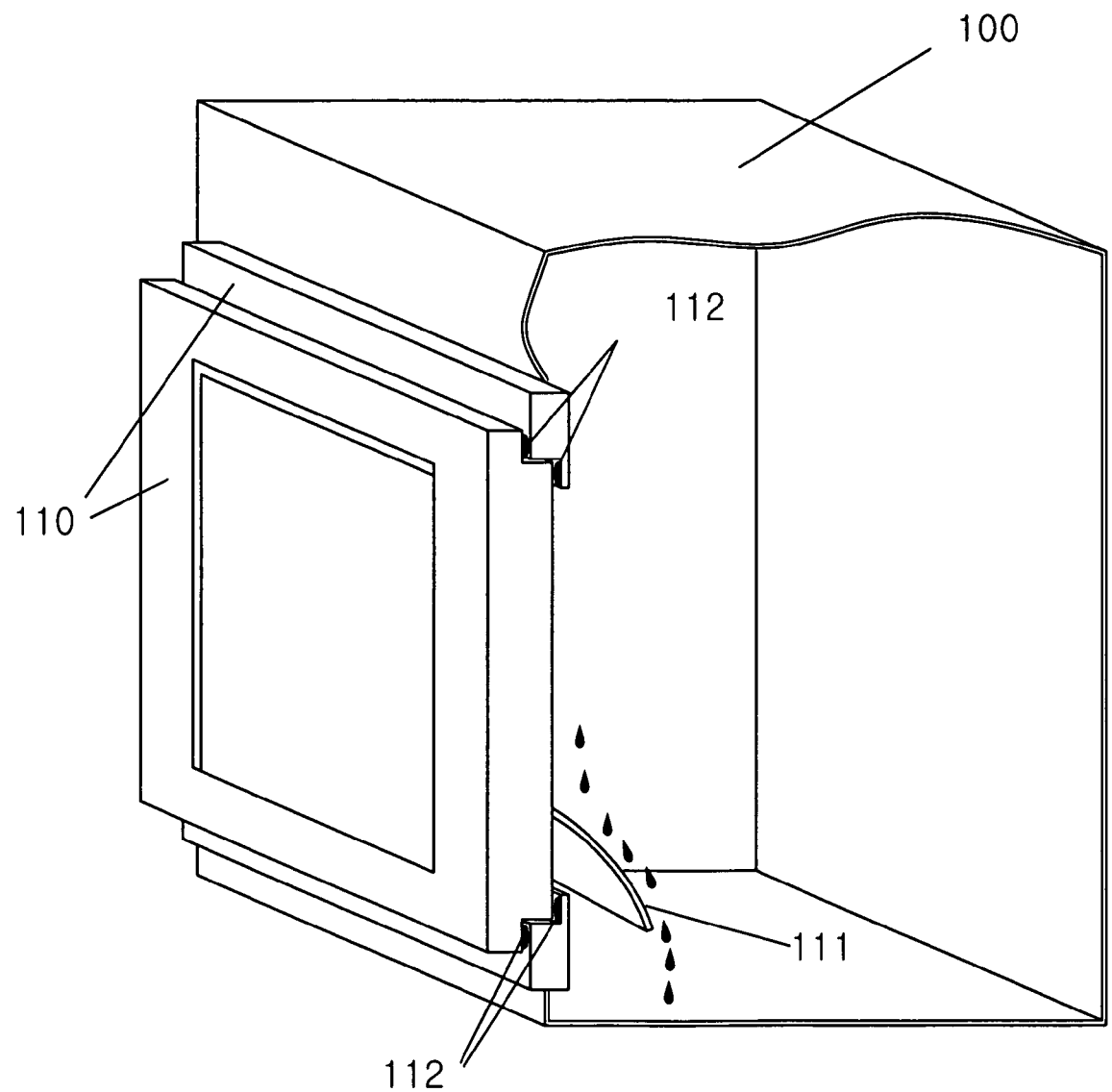
FIG. 9 is a side view of a transparent door of a pet bathing apparatus according to an exemplary embodiment of the present invention.

FIG. 9 is a side view of a transparent door of a pet bathing apparatus according to an exemplary embodiment of the present invention. Referring to FIG. 9, a downwardly inclined plate 111 may be provided at a lower position on an inner surface of the transparent door 110, thus allowing water flowing downward along the inner surface of the transparent door to remain in the inner casing 100 and enter the base part 600, and preventing water from flowing out of the apparatus. A water-proof sponge or a rubber material 112 may be provided around an inner edge of the transparent door 110, thus allowing a better seal when closing the door.

As FIG. 2 shows, the base part 600 may include a support plate 610 and a net 620 arranged on an upper surface of the support plate 610. The support plate 610 has a lattice shape formed with bars 611, having fitting notches 611a at regular intervals, overlapping in a crisscross pattern. The bars 611 may be made of a sturdy material such as steel. Such construction prevents the support plate 610 from sagging, allows wash water or water containing additives such as shampoo to be easily sprayed upwards, and allows dirty water to drain into the drain unit 700. Further, the net 620, which may be a steel net, allows the pet to comfortably step and stand thereon.

The spray nozzle unit 300 may include fixed nozzles 310 and rotary nozzles 320 to spray wash water into the inner casing 100 at high pressure. In this case, the fixed nozzles 310 are mounted to a sidewall of the inner casing 100 to substantially uniformly distribute wash water at an angle of about 15° to 60°. The rotary nozzles 320 dynamically spray pressurized water onto the pet, including body parts that are difficult to wash using only the fixed nozzles 310.

When highly pressurized water flows into rotary blades defining a water supply path, the water is sprayed in a direction of holes formed in the rotary blades of the rotary nozzle 320. Due to the angle of the sprayed water and the force of the water colliding with the inner casing 100 and the base part 600, the rotary blades may rotate without additional power. Further, fixed nozzles 310 may be additionally installed at a central portion of the inner casing 100 where water sprayed from the rotary nozzles 320 may not reach.

The spray nozzle unit 300 may also include movable nozzles 330. As FIG. 5 shows, the movable nozzles 330 may be installed along a movable water supply tube 411, which may have a curved shape that is similar to the shape of an animal's back, such as a dog's back. The movable water supply tube 411 may be arranged at an upper position in the inner casing 100 to be repeatedly moved forwards and backwards, up and down, and left to right, to thus substantially uniformly spray wash water on the upper portion of the pet at high pressure.

Referring to FIG. 3, the water supply unit 400 may include branch tubes 410, a main tube 420, a high-pressure water pump 460, a water feeding pipe 430, a water tank 480 (FIG. 8 and FIG. 10), a shampoo container 440, and a perfume container 450, thus supplying wash water, water containing shampoo, and perfume to the spray nozzle unit 300.

The branch tubes 410 are provided outside of the inner casing 100 and coupled with the spray nozzles 310, 320, and 330, thus providing water supply paths. The main tube 420 functions to connect the branch tubes 410 to a single path. The high-pressure water pump 460 supplies wash water from the water tank 480 to the main tube 420 while pressurizing the wash water. The water feeding pipe 430 defines a wash water supply path from the water tank 480 to the main tube 420.

The main tube 420 of the water supply unit 400 may have a substantially rectangular shape so that it may be in close contact with a sidewall of the inner casing 100. When the main tube 420 has a rectangular shape, the branch tubes 410 may be separated and connected to surfaces of the main tube 420, according to water supply positions. Therefore, it is easy to efficiently arrange the plurality of tubes.

Figure 10:
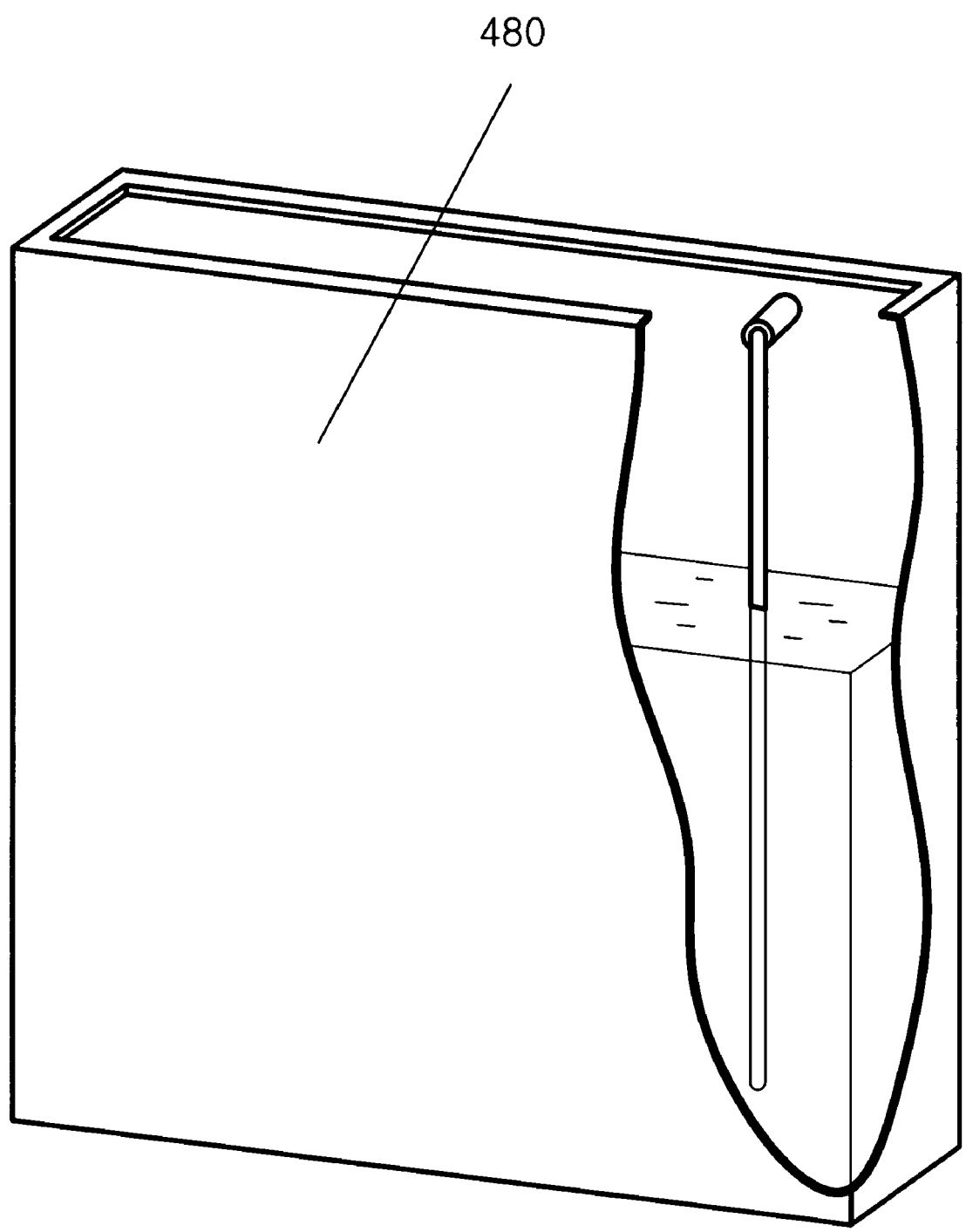
FIG. 10 shows a water tank according to an exemplary embodiment of the present invention.

Referring to FIG. 10, the water tank 480 may include a sensor that detects the tank's actual water level. Hence, in addition to detecting whether the tank is full or empty, the sensor also detects the actual water level at any level between full and empty. The sensor may be included at an upper portion of the tank, and a display unit of a control unit 800 displays the detected water level. A user may add water to the water tank 480, or as described below, it may be automatically added to the water tank 480.

When wash water passes through the water feeding pipe 430 at high speed, the internal pressure of the water feeding pipe 430 is reduced. At this time, due to the pressure difference between the shampoo container 440 or the perfume container 450 and the water feeding pipe 430, shampoo or perfume may be automatically fed into the water feeding pipe 430, thus forming a shampoo or perfume supply path. Further, a solenoid valve may be provided in each of the shampoo and perfume supply paths to control whether wash water, water containing shampoo, or perfume flows along the water feeding pipe 430. In addition to shampoo and perfume, containers for other substances such as, for example, cleaners and/or disinfectants may be included. In this case, the apparatus may be operated to perform a self-cleaning cycle.

Figure 11:
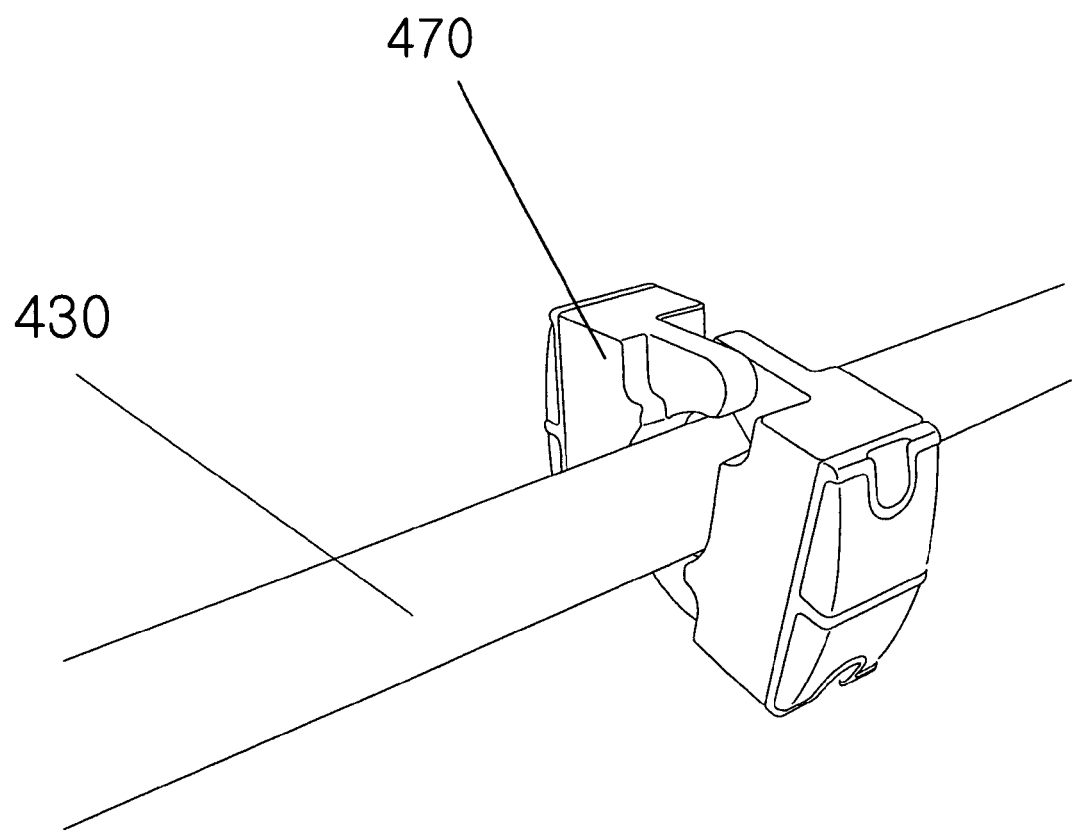
FIG. 11 shows a water magnetizing apparatus according to an exemplary embodiment of the present invention.

The water supply unit may also include a water magnetizing apparatus. Referring to FIG. 11, a water magnetizing apparatus 470 may be attached to the water feeding pipe 430 in order to magnetize the water flowing through the water feeding pipe 430. Including the water magnetizing apparatus 470 may provide magnetized water, which may protect a pet's skin and fur, as well as help prevent illness.

Initially, the water supply unit 400 may periodically repeat water supply on and off cycles, thus allowing the pet to comfortably breathe and adjust to the bathing apparatus. The water supply unit 400 may then perform an initial water application process to provide only wash water to the pet, thus sufficiently getting the pet wet. Afterwards, a shampoo application process, a rinsing process, and a perfume application process may be sequentially carried out. In the shampoo application process, shampoo is added to the water, thus providing water containing shampoo, as described above. In the rinsing process, only wash water is supplied to remove the shampoo. In the perfume application process, perfume is provided to eliminate the bad odor of the pet. A conditioner application process may also be inserted between the shampoo application process and the rinsing process.

At an initial stage of the water application process, some of the plurality of spray nozzles 310 and 320 may be operated. As the washing operation proceeds, the number of operated spray nozzles 310 and 320 gradually increases, thus increasing the quantity of sprayed water. Such operations may make it easier for the pet to adapt to the apparatus. Further, a rest period may be provided between processes, thus allowing the pet to easily breathe and feel comfortable. Additionally, the water supply unit may provide at least one rest period during the water application process, the shampoo application process, the conditioner application process and/or the rinsing process.

Referring to FIG. 1 and FIG. 7, the drain unit 700 may include a water collecting tray 710, a first filter 720, a second filter 730, and a drain pump 740. The water collecting tray 710 collects water, which flows downward from the inner casing 100 and subsequently flows along an inclined surface of the tray 710, around the center of a water outlet. The first filter 720, which may have a plate shape, is arranged on a lower portion of the water collecting tray 710 to filter large contaminants. The first filter 720 may be a net having a plurality of through holes that are opened in a vertical direction. The second filter 730 is arranged under the first filter 720, and it may comprise a fine net having the shape of a peaked hat to filter pet hair or fine contaminants. The water collected in the water collecting tray 710 is discharged to the outside by the drain pump 740.

The blowing unit 500 functions to provide hot and cold air into the inner casing 100, thus drying the pet after the pet has been washed. The blowing unit 500 may include a fan 510, an exhaust port 520, and a hot air circulation hole 530. The fan 510 includes an electric preheating unit to preliminarily heat blown air and regulate the temperature of the air using an electronic regulating system. The fan 510 transmits air to the inner casing 100 via air lines 540. Air holes are formed on upper and side surfaces of the inner casing 100 to feed hot and cold air from the air lines 540 into the inner casing 100. The air may also be fed into the inner casing 100 via the base part 600. The fan 510 operates after a predetermined time has passed, during which the pet typically shakes water off of its body. The fan 510 may alternately blow hot air and cold or room temperature air, thus lessening the pet's discomfort.

The exhaust port 520 defines a path to allow the upper portion of the inner casing 100 to communicate with an outside portion of the outer casing 200, thus allowing discharge of contaminated air from the interior of the inner casing 100 to outside of the outer casing 200, while the air is blown and circulated to dry the pet. Since the pet may hear a person's voice through the exhaust port 520, the exhaust port 520 may serve as a megaphone for calming the pet by talking to the pet.

The hot air circulation hole 530 defines a path between a sidewall of the inner casing 100 and the outer casing 200 to secondarily circulate hot air between the inner casing 100 and the outer casing 200, thus reducing heat loss. Further, the hot air circulation hole 530 moves hot air from the interior of the inner casing 100 to the fan 510, thus allowing hot air to be drawn into the inner casing 100 again and recycled.

A heat source, such as an ultraviolet (UV) light, may be included to provide heat and increase a pet's metabolism. For example, as FIG. 1 shows, a halogen lamp 900 may be included in an upper portion of the space defined by the inner casing 100. The halogen lamp 900 may improve the pet's blood circulation. Furthermore, a UV lamp may be utilized to sanitize the inner casing 100.

Referring to FIG. 8, according to an exemplary embodiment of the present invention, the pet bathing apparatus may include a control unit 800 to electronically control the operation of the spray nozzle unit 300, the water supply unit 400, the drain unit 700, and the blowing unit 500, thus allowing the apparatus' entire operation to be conveniently controlled by a person who is outside the apparatus. Through the control unit 800, for example, the water level of the water tank 480 or the water collecting tray 710, the opening and closure of the water feeding pipe 430 using an electromagnetic switch, the preliminary heating temperature of the preheating unit for heating supplied water, a washing process, a drying process, a processing time, and the temperature of blown air may be controlled. The cleansing processes and times for cleansing may be customized and preprogrammed depending on the pet's size, as well as fur length and amount, thereby enabling one touch operation. These settings may also be changed by the user. Further, air and water temperature may be preprogrammed by the user, as well as changed by the user. Additionally, in order to protect the pet, the control unit 800 may utilize sensors to detect and display a warning signal when the transparent door 110 is open, when the water temperature is unusually high, when the blowing unit 500 malfunctions, and when there is a lack of cleaning water.

Regarding the water level of the water tank 480 (FIG. 10), the sensor detects the tank's current level. When the tank is full, the valve for a water supply pipe is automatically closed. On the other hand, when the tank is empty, the valve is automatically opened. Further, the tank's water level is displayed on the operational unit so that a user may see the current water level and add more water to the tank.

As described above, exemplary embodiments of the present invention provide a pet bathing apparatus that may be capable of uniformly and dynamically spraying wash water on substantially every body part of a pet, thus enhancing cleanliness and washing efficiency.

Further, embodiments of the present invention provide a pet bathing apparatus that may be capable of smoothly discharging wash water and hot and cold air fed into a sealed space to the outside of the apparatus, together with dirt removed from the pet's body.

Embodiments of the present invention also provide a pet bathing apparatus having a firm base that does not sag due to the pet's weight and that enables easy draining, thus prolonging the life span of the apparatus.

Further, embodiments of the present invention provide a pet bathing apparatus that has a transparent door, gradually increases the quantity of wash water at an initial stage of a water spraying process, and has rest periods during a washing operation, which may lessen a pet's fear and make it feel more comfortable.

Embodiments of the present invention provide a pet bathing apparatus that may prevent a pet from being injured by providing a net or strap for a pet that resists being washed in the apparatus.

Further, embodiments of the present invention provide a pet bathing apparatus that includes fixed, rotary, and movable nozzles to spray wash water straight or spray wash water while rotating or moving, thus allowing substantially every body part of the pet, including under the legs and the groin, to be thoroughly washed.

Embodiments of the present invention provide a pet bathing apparatus that does not need additional power to rotate the spray nozzles, and enhances the utilization of hot air, thus reducing power consumption.

Furthermore, embodiments of the present invention provide a pet bathing apparatus that may be capable of washing and drying a pet in a space suitable for the pet's size, thus enhancing the washing efficiency and saving energy.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A pet bathing apparatus, comprising:
an inner casing defining a space to accommodate a pet therein and comprising 1) a transparent door for entrance of the pet, 2) a collapsible partition wall capable of being unfolded and rotated inwards to partition the space into at least two spaces, and 3) a swing-like net or a swing-like strap for suspending the pet in air;
an outer casing provided outside the inner casing and spaced apart from the inner casing;
a base part, comprising: a support plate including openings; and a net arranged on the support plate;
a spray nozzle unit distributing water into the space, comprising: a plurality of fixed nozzles; and
a plurality of rotary nozzles arranged below the base part and constructed to spray water into the space from beneath the base part;
a water supply unit comprising 1) a main tube coupled with a plurality of branch tubes, the branch tubes being coupled with the spray nozzle unit; and 2) a water feeding pipe and a water magnetizing apparatus attached to the water feeding pipe, the water supply unit operable to perform a water application process that periodically repeats water supply on and off cycles to the space before performing a shampoo application process;
a drain unit for collection and removal of water; and
a blowing unit for providing air to the space.

2. The pet bathing apparatus of claim 1, wherein a lower portion of the transparent door comprises a downwardly inclined plate for allowing water flowing downward along an inner surface of the transparent door to remain in the inner casing, and a water-proof sponge or a rubber material is arranged around an inner edge of the transparent door.

3. The pet bathing apparatus of claim 1, wherein the spray nozzle unit further comprises at least one nozzle on a movable water supply tube, the movable water supply tube being arranged at an upper position in the inner casing.

4. The pet bathing apparatus of claim 1, wherein the water supply unit further comprises a second container for supplying perfume to the water feeding pipe, and the substance supplied by the first container is shampoo; to provide water containing conditioner, a rinsing process to provide water only, and a perfume application process to provide water containing the perfume, some of the nozzles being operated at an initial stage of the water application process; and
wherein a rest period is provided between each process.

5. The pet bathing apparatus of claim 4, wherein the water supply unit provides at least one rest period during at least one of the water application process, the shampoo application process, the conditioner application process, the rinsing process, and the perfume application process.

6. The pet bathing apparatus of claim 1, wherein the main tube of the water supply unit has a substantially rectangular shape and is attached to the inner casing, and the branch tubes are separately connected to the main tube according to a water supply position.

7. The pet bathing apparatus of claim 1, further comprising:
a control unit to electronically control the spray nozzle unit, the water supply unit, the drain unit, and the blowing unit.

8. The pet bathing apparatus of claim 1, wherein the outer casing substantially has a dog shape or a box shape;
wherein the support plate comprises crisscrossed steel bars and the net comprises steel; wherein the water feeding pipe couples a water tank with the main tube;
wherein the drain unit comprises: a water collecting tray to collect water; a first filter arranged at a lower portion of the water collecting tray; a second filter arranged under the first filter; and a drain pump to discharge collected water; and
wherein the blowing unit comprises: a fan for alternately providing air of a first temperature and air of a second temperature to the space through an upper surface and a side surface of the inner casing and through the base part; an exhaust port for discharge of air from the space to an outside of the outer casing; and a hot air circulation hole arranged in the inner casing for circulating air from the space to the fan.

9. The pet bathing apparatus of claim 1, wherein the inner casing further comprises a separator, the separator being capable of partitioning the space into at least two spaces so that two pets may be simultaneously bathed.

* * * * *